United States Patent
Huzaifa

(10) Patent No.: US 11,518,259 B2
(45) Date of Patent: Dec. 6, 2022

(54) SYSTEM AND METHOD OF MANAGING POWER FOR RECHARGING ELECTRIC VEHICLES

(71) Applicant: Muhammad Huzaifa, South San Francisco, CA (US)

(72) Inventor: Muhammad Huzaifa, South San Francisco, CA (US)

( * ) Notice: Subject to any disclaimer, the term of this patent is extended or adjusted under 35 U.S.C. 154(b) by 465 days.

(21) Appl. No.: 16/586,061

(22) Filed: Sep. 27, 2019

(65) Prior Publication Data
US 2021/0094432 A1    Apr. 1, 2021

(51) Int. Cl.
*B60L 53/50* (2019.01)
*B60L 53/63* (2019.01)
*G05F 1/66* (2006.01)

(52) U.S. Cl.
CPC ............... *B60L 53/50* (2019.02); *B60L 53/63* (2019.02); *G05F 1/66* (2013.01)

(58) Field of Classification Search
CPC .......... B60L 53/50; B60L 53/63; B60L 53/67; B60L 53/68; G05F 1/11; G06Q 10/06315; G06Q 50/06; H02J 3/32; H02J 3/381; H02J 7/35; H02J 7/0013; Y02T 90/12; Y02T 90/16; Y02T 90/167; Y02T 10/70; Y04S 10/126; Y04S 30/12
See application file for complete search history.

(56) References Cited

U.S. PATENT DOCUMENTS

| | | | | |
|---|---|---|---|---|
| 10,389,121 | B1 * | 8/2019 | Sherry | H02S 10/12 |
| 2003/0120442 | A1 * | 6/2003 | Pellegrino | G07F 15/005 |
| | | | | 702/60 |
| 2009/0314926 | A1 * | 12/2009 | Hinderling | F03G 6/001 |
| | | | | 250/203.4 |
| 2010/0314935 | A1 | 12/2010 | Reichart et al. | |
| 2011/0241604 | A1 * | 10/2011 | Anderson | H01M 10/44 |
| | | | | 320/101 |
| 2013/0060396 | A1 | 3/2013 | Tomlinson | |
| 2013/0213038 | A1 | 8/2013 | Lazaris | |
| 2015/0298565 | A1 * | 10/2015 | Iwamura | B60L 53/60 |
| | | | | 701/22 |
| 2017/0003701 | A1 | 1/2017 | Miller et al. | |

(Continued)

FOREIGN PATENT DOCUMENTS

WO    WO2014078659 A2    7/2015

*Primary Examiner* — Richard Isla
*Assistant Examiner* — Johali A Torres Ruiz

(57) ABSTRACT

A method of managing power for recharging electric vehicles efficiently stores, delivers, and distributes energy. The method includes a plurality of user accounts managed by at least one remote server. The system includes a plurality of mobile computerized recharging stations, wherein each mobile computerized recharging station tracks a location and a current amount of available power within a power storage system. The method begins by prompting each user account to search for at least one best-match station. A search request is relayed for the best-match station from a corresponding user PC device to the remote server. The current location is compared to the station location for each mobile computerized recharging station. The minimum threshold of available power is compared to the current amount of available power for each proximal station. The sufficiently-powered station is displayed as the best-match station through the user PC device.

14 Claims, 17 Drawing Sheets

(56) References Cited

U.S. PATENT DOCUMENTS

| | | | | |
|---|---|---|---|---|
| 2017/0282736 A1* | 10/2017 | Goei | ................. | B60L 53/62 |
| 2019/0248243 A1* | 8/2019 | Gaither | ................. | B60L 8/003 |
| 2020/0376972 A1* | 12/2020 | Martin | ................. | G01R 31/382 |

* cited by examiner

SYSTEM AND METHOD OF MANAGING POWER FOR RECHARGING ELECTRIC VEHICLES

FIELD OF THE INVENTION

The present invention generally relates to managing power for recharging electric vehicles. More specifically, the present invention facilitates the identification of and distribution of power for mobilized computerized recharging stations with the ideal location sufficient power supply.

BACKGROUND OF THE INVENTION

Electric vehicles are becoming more favorable with advancements in technology and the need to reduce pollution. Although more and more people are opting for electric vehicles, the transition from gas-powered cars to electric cars will take more time. With the growing popularity of electric cars, it is essential that charging stations are easily accessible, and the power is not wasted. As popular electric vehicles are expensive, electric vehicles are typically driven around a given area. However, with the growing popularity of electric cars, more areas are in need of charging station that may not have initially been stocked with charging stations. Furthermore, demand for charging station in a certain area may be influenced by events such as sporting events, concerts, and so on.

The present invention allows electric vehicles, among other electrical devices, to easily access recharging stations as the present invention requires no installation and is capable of forming a network of grids that efficiently redistribute power where it is needed. The present invention is self-contained and self-deployable such that the present invention quickly responds to high demands. The present invention is able to accommodate a variety of devices that are only capable of storing power in alternating current (AC) form and power in direct current (DC) form. The present invention balances electrical loads and the distribution of electrical energy. The present invention utilizes natural power supplies such as the Sun and maximizes power intake from the Sun by being readily movable depending on weather forecasts.

DETAIL DESCRIPTIONS OF THE INVENTION

All illustrations of the drawings are for the purpose of describing selected versions of the present invention and are not intended to limit the scope of the present invention.

Figure 1:
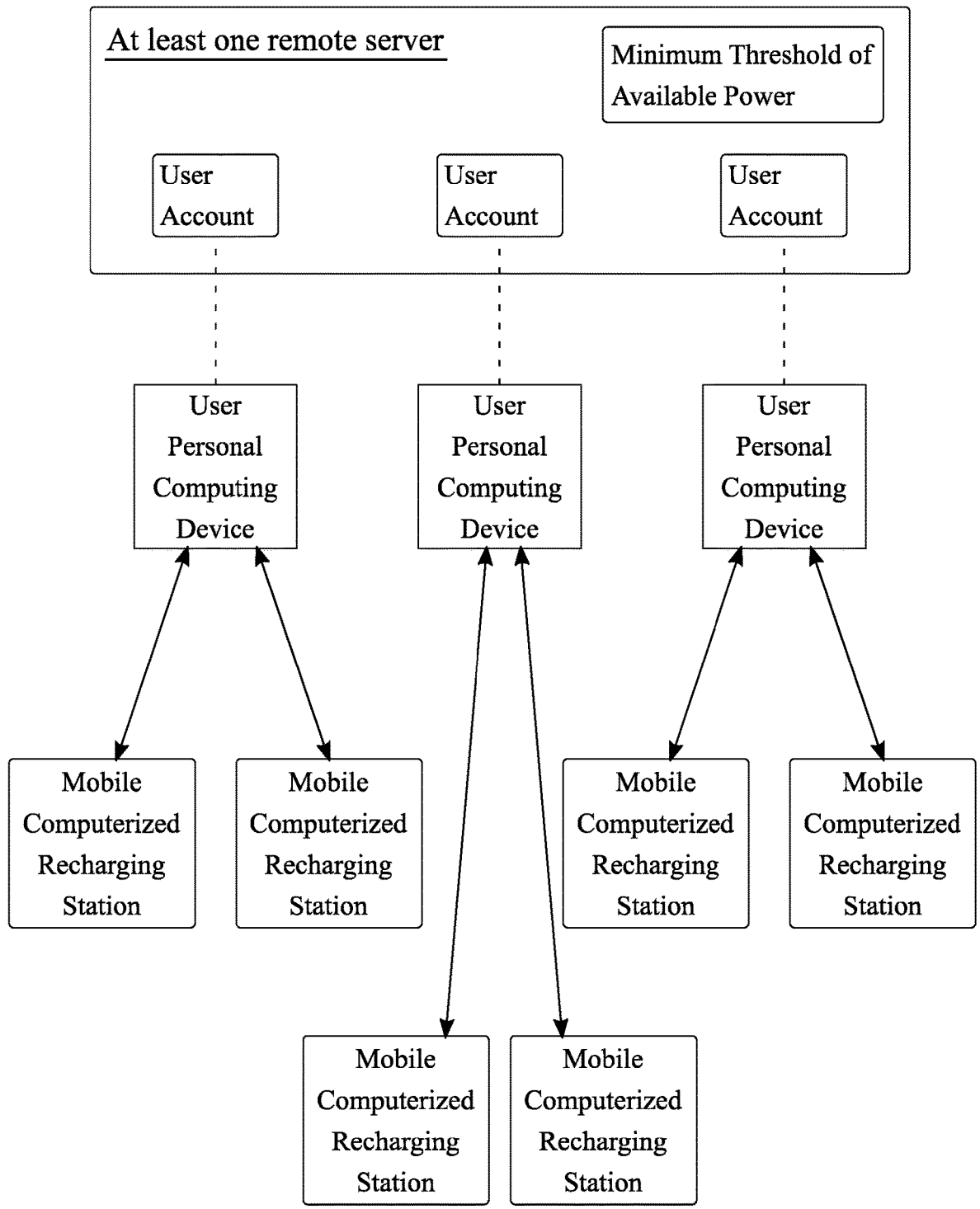
FIG. 1 is a schematic view for a method of the present invention.
Figure 2:
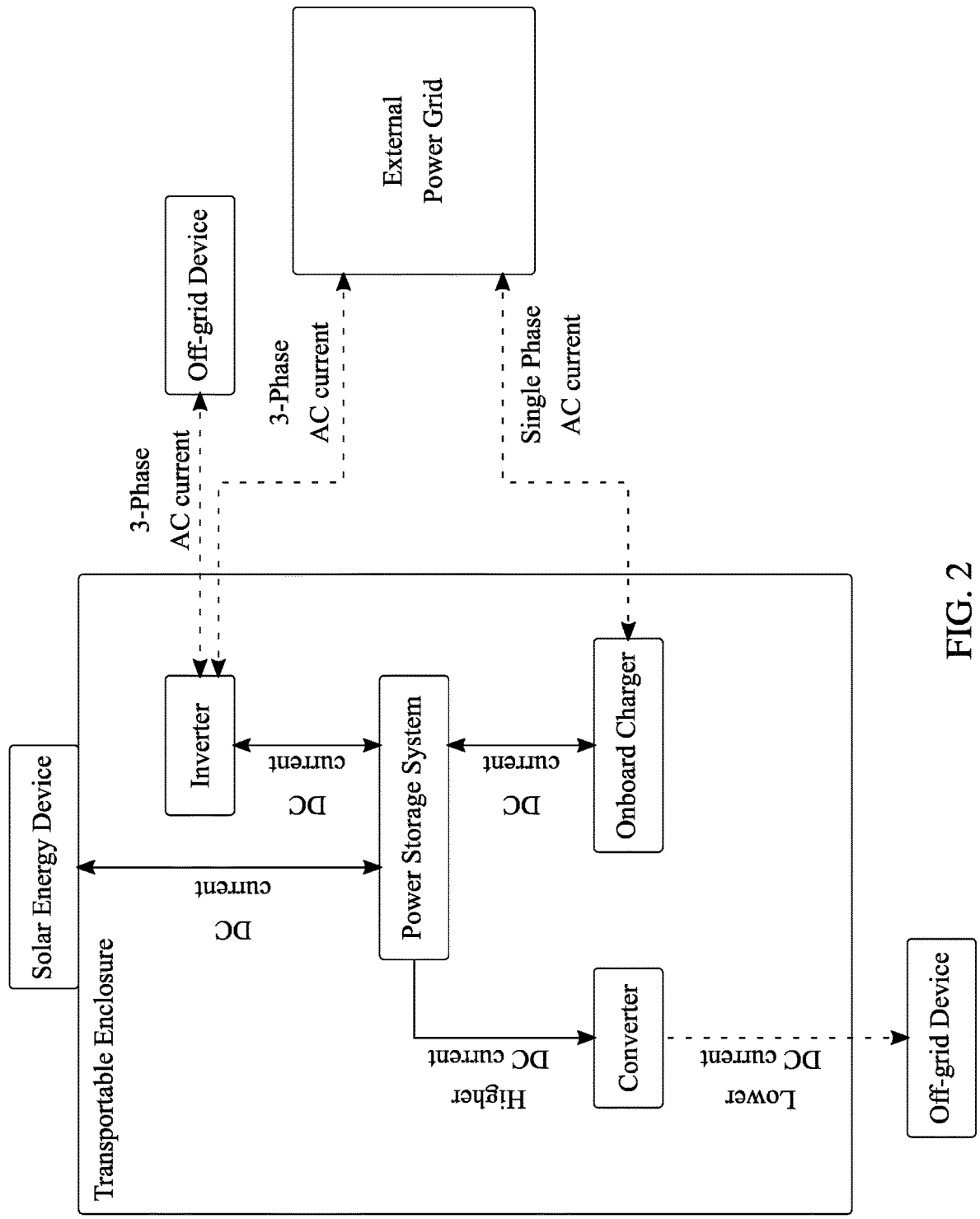
FIG. 2 is a schematic view for a system of the present invention.

The present invention is a system and method of managing power for recharging electric vehicles. The present invention produces renewable electrical energy, stores electrical energy, and efficiently distributes electrical energy. The present invention allows facilitates the identification of the nearest charging station and ensures each station has a sufficient amount of electrical energy for an electric vehicle to be fully charged. Thus, the physical system used to implement the method for the present invention includes at least one remote server, a plurality of user personal computing (PC) devices, and a plurality of mobile computerized recharging stations, seen in FIG. 1. A plurality of user accounts is managed by the at least one remote server, wherein each user account is associated with a corresponding user PC device. Any data associated with the plurality of user accounts is stored on the at least one remote server. Each user account is granted access to harness power from the plurality of mobile computerized recharging stations such that the power supply of the plurality of mobile computerized recharging stations is only reserved for the plurality of user accounts. The plurality of user PC devices is preferably a plurality of smart phones. In alternate embodiments of the present invention, the user PC devices may also be, but is not limited to, a plurality of laptops, tablets, smart watches, and desktops. Furthermore, a minimum threshold of available power is stored on the remote server (Step A). The plurality of mobile computerized recharging stations receives, stores power from an external power grid, and provides available power for the plurality of user accounts to recharge a variety of devices, preferably an electric vehicle. The plurality of mobile computerized recharging stations allows power to be easily accessible by each user account. In order to efficiently distribute energy among the plurality of mobile computerized recharging stations, each mobile computerized recharging station tracks a station location and a current amount of available power within a power storage system (Step B). The station location includes an address in order for the user account to receive directions from a current location of the user PC device to the station location with the user PC device. The power storage system of each mobile computerized recharging station is capable of harnessing power from the external power grid, storing that power until distributed to a variety of devices associated with a user account.

Figure 3:
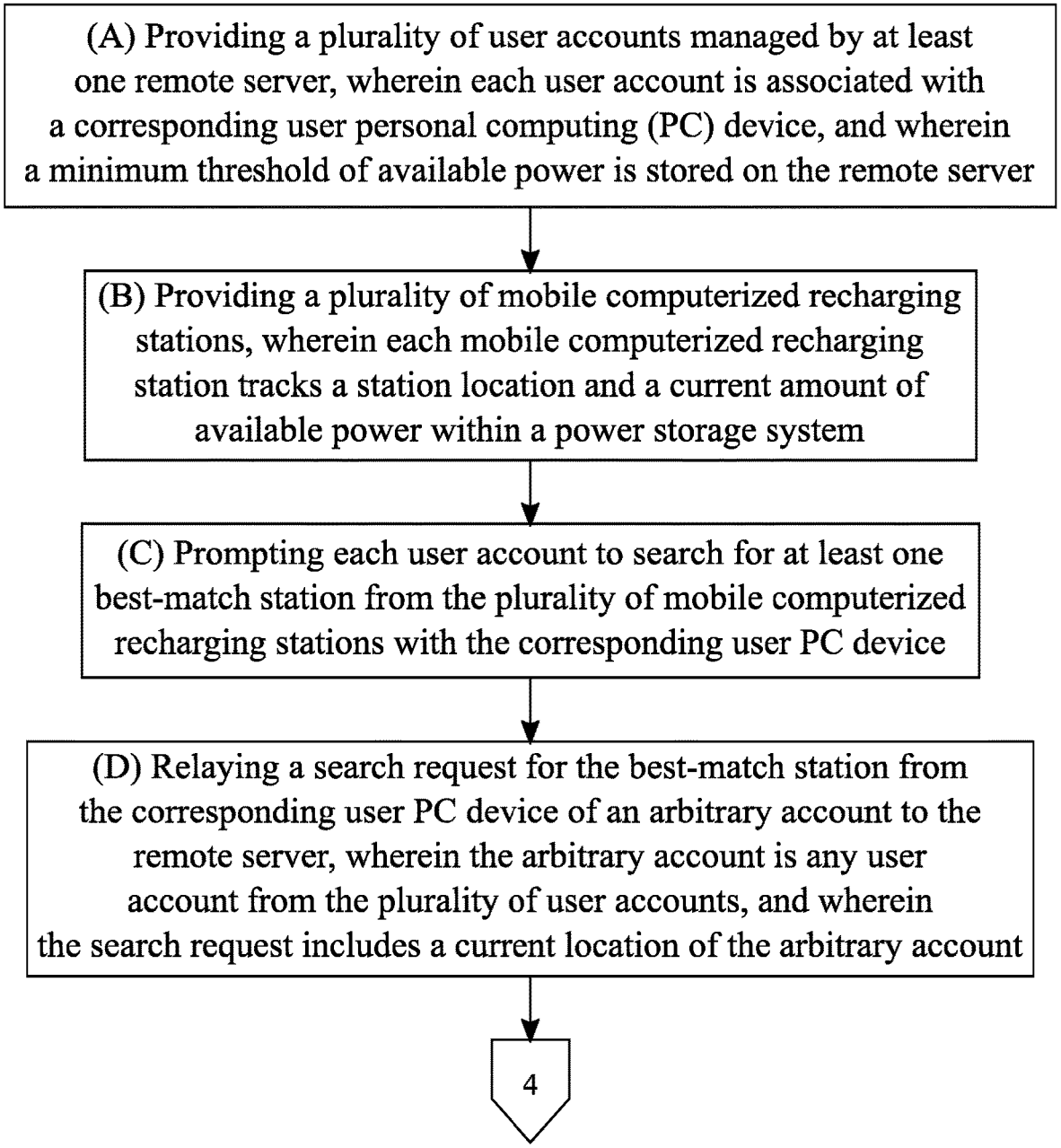
FIG. 3 is a flowchart illustrating the overall process for a method of the present invention.
Figure 4:
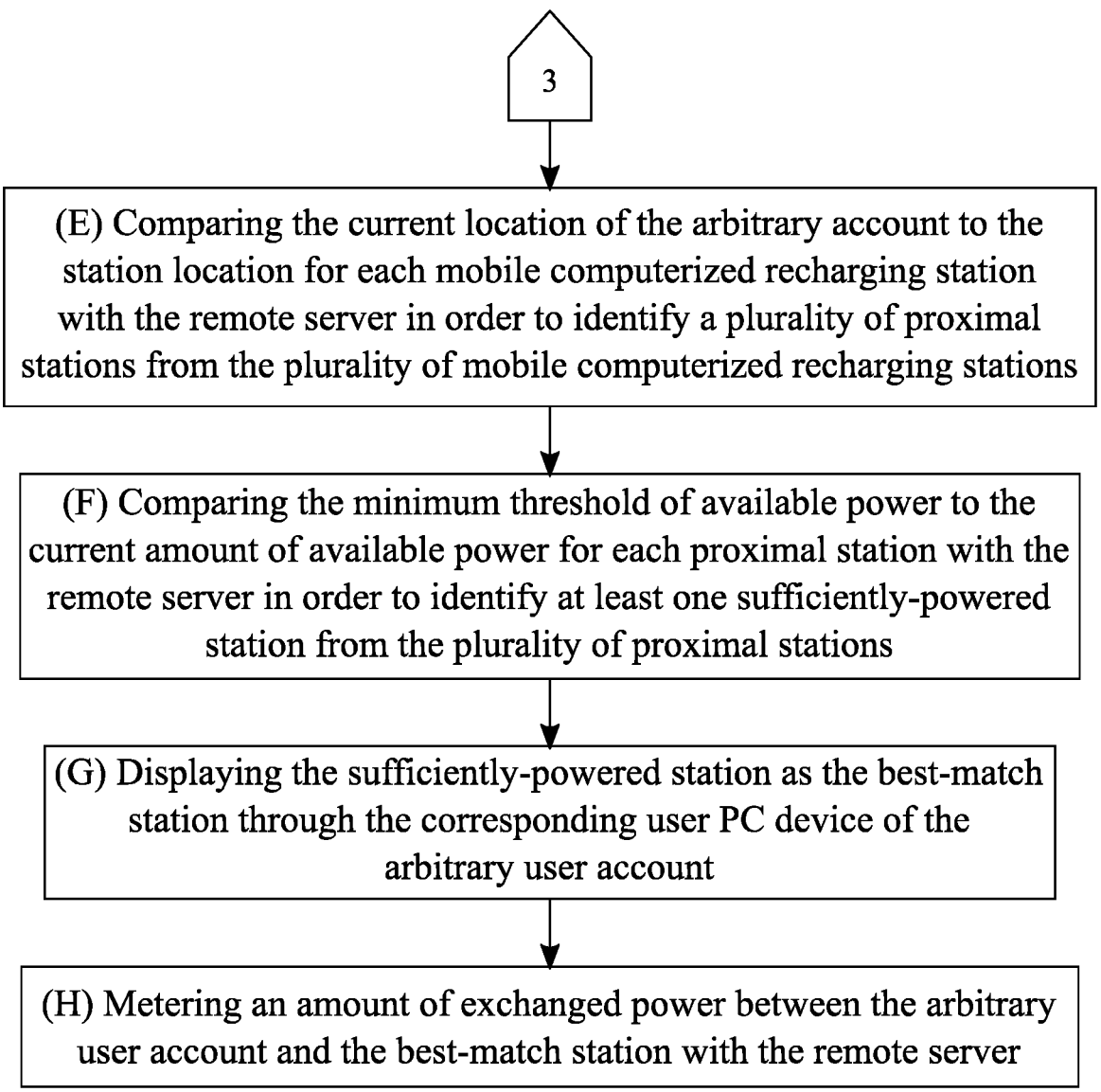
FIG. 4 is a flowchart illustrating a continuation of the flowchart in FIG. 3.

The overall process for the method of the present invention, seen in FIG. 3 and FIG. 4, includes the following steps that are implemented with the at least one remote server, the plurality of user PC devices, and the plurality of mobile computerized recharging stations. As shown in FIG. 3, the overall process begins by prompting each user account to search for at least one best-match station from the plurality of mobile computerized recharging stations with the corresponding user PC device (Step C). The at least one best-match station is preferably the closest mobile computerized recharging station from the plurality of mobile computerized recharging stations with a sufficient amount of available power. In order to identify the closest station with a sufficient power supply, a search request for the best-match station is relayed from the corresponding user PC device of an arbitrary account to the remote server (Step D). Only registered users may access the plurality of mobile computerized recharging stations as the arbitrary account is any user account from the plurality of accounts. Moreover, the search request includes a current location of the arbitrary account. Furthermore, the current location of the arbitrary account is compared to the station location for each mobile computerized recharging station with the remote server in order to identify a plurality of proximal stations from the plurality of mobile computerized recharging stations (Step E), seen in FIG. 4. The plurality of proximal stations is a set of mobile computerized recharging stations within a given radius of the user PC device. Similarly, the minimum threshold of available power is compared to the current amount of available power for each proximal station with the remote server in order to identify at least one sufficiently-powered station from the plurality of proximal stations (Step F). At least one sufficiently-powered station stores power that is available to fully recharge an off-grid device associated with the user PC account such as an electric vehicle. The user of the arbitrary account is able to view the at least one sufficiently-powered station as the sufficiently-powered station is displayed as the best-match station through the corresponding user PC device of the arbitrary user account (Step G). The user PC device may then provide directions to the station location of the best-match station so that the user of the arbitrary account can travel to the best-match station in order to recharge their off-grid device. An amount of exchanged power is metered between the arbitrary user account and the best-match station with the remote server in order to monitor and replenish the available power for the best-match station (Step H). The amount of exchanged power is the power retrieved from the power storage system of the best-match station.

Figure 5:
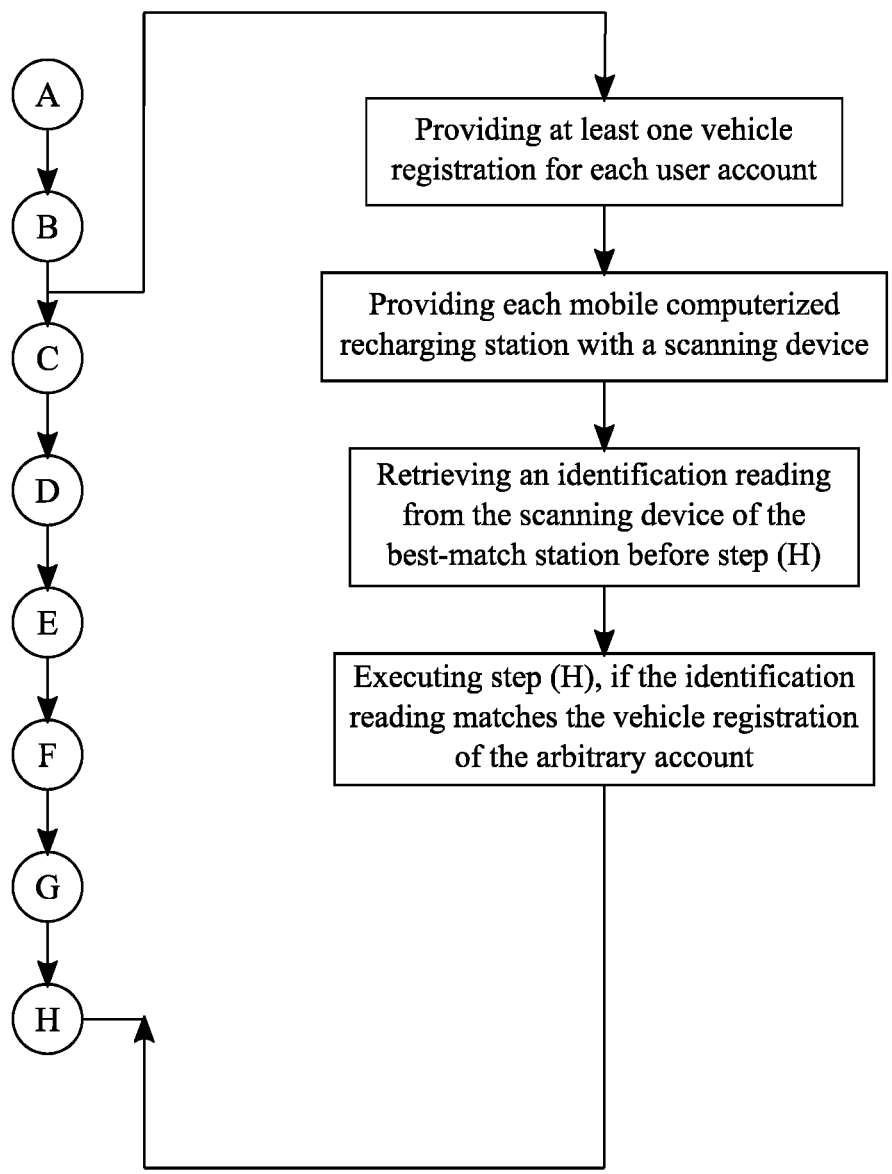
FIG. 5 is a flowchart illustrating the subprocess for allowing the metering of an amount of exchanged power if an identification reading matches at least one vehicle registration for a user account.

In order to access the plurality of mobile computerized recharging stations of the present invention, at least one vehicle registration is provided for each user account, and each mobile computerized recharging station is provided with a scanning device, seen in FIG. 5. The vehicle registration is preferably a license plate number or a vehicle identification number (VIN) that allows the remote server to differentiate between the devices associated with each user account. Moreover, the vehicle registration is preferably a readable identification that is externally displayed on an off-grid device of the user account that allows the scanning device to scan the vehicle registration. The scanning device is preferably a camera. An identification reading is retrieved from the scanning device of the best-match station before Step H so that the best match station is able to identify the vehicle associated with the arbitrary user account. Step H is then executed if the identification reading matches the vehicle registration of the arbitrary account, thereby allowing only registered user accounts to access the available power within the power storage system of the best-match station.

Figure 6:
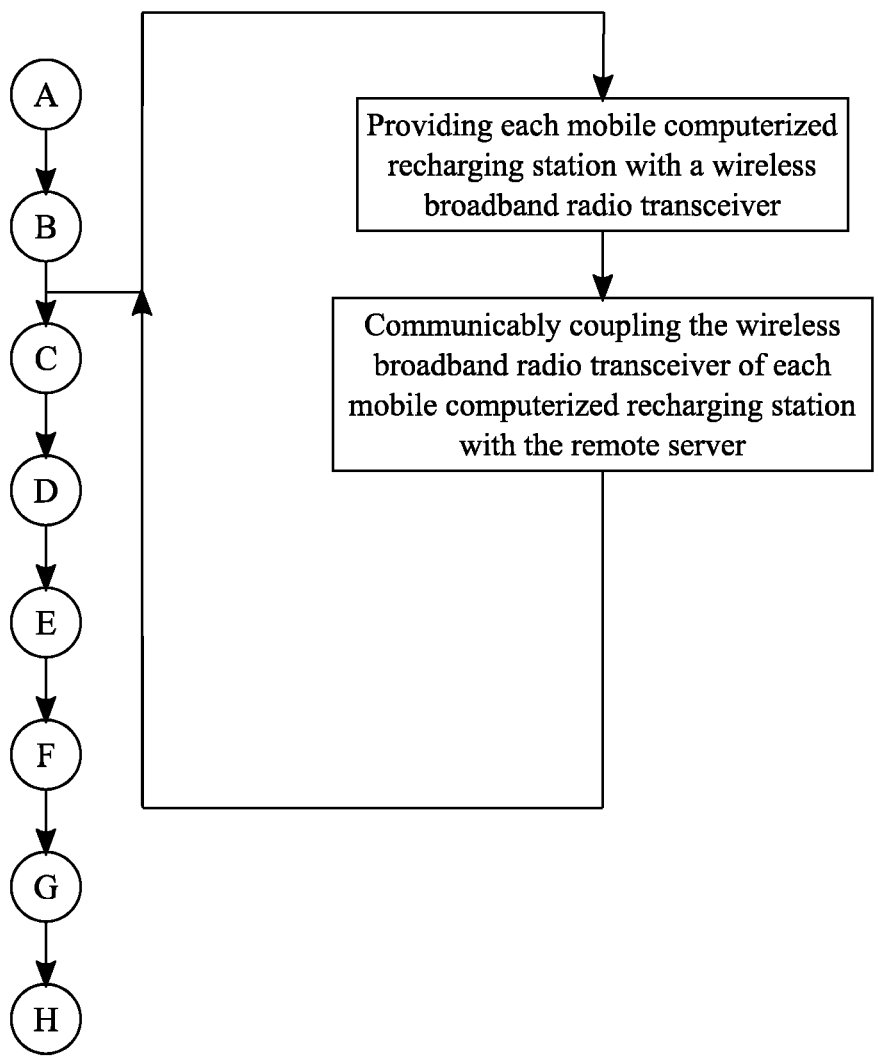
FIG. 6 is a flowchart illustrating the subprocess for each mobile computerized recharging station wirelessly communicating with the remote server with a wireless broadband radio transceiver.

As shown in FIG. 6, each mobile computerized recharging station with a wireless broadband radio transceiver is provided in order for each mobile computerized recharging station to engage with the remote server. In the preferred embodiment of the present invention, the wireless broadband radio transceiver is a 4G LTE communication hardware system that wirelessly connects each mobile computerized recharging station with the power grid. Moreover, the wireless broadband radio transceiver of each mobile computerized recharging station is communicably coupled with the remote server. Each mobile computerized recharging station therefore remains in constant communication with the remote server regardless of the station location of each mobile computerized recharging station with respect to the remote server.

Furthermore, for the preferred embodiment of the present invention, each mobile computerized recharging station is housed within a transportable enclosure, which is sized to fit inside a cargo van and/or is sized to fit inside a tractor trailer. The transportable enclosure protects the mobile computerized recharging station from conditions of the surrounding environment. The transportable enclosure also allows each mobile computerized recharging station to be easily and quickly transported from a less-frequented area to a high-demand area. The transportable enclosure may be transported with a van or truck that is able to securely and safely mobilize the mobile computerized recharging station.

Each mobile computerized recharging station includes a power storage system that is preferably a modular lithium-ion based battery system. The power storage system as a modular lithium-ion based battery system is able to store and distribute sufficient power. The modular lithium-ion based battery storage system outputs approximately 350 volts-1000 volts in DC form.

Figure 7:
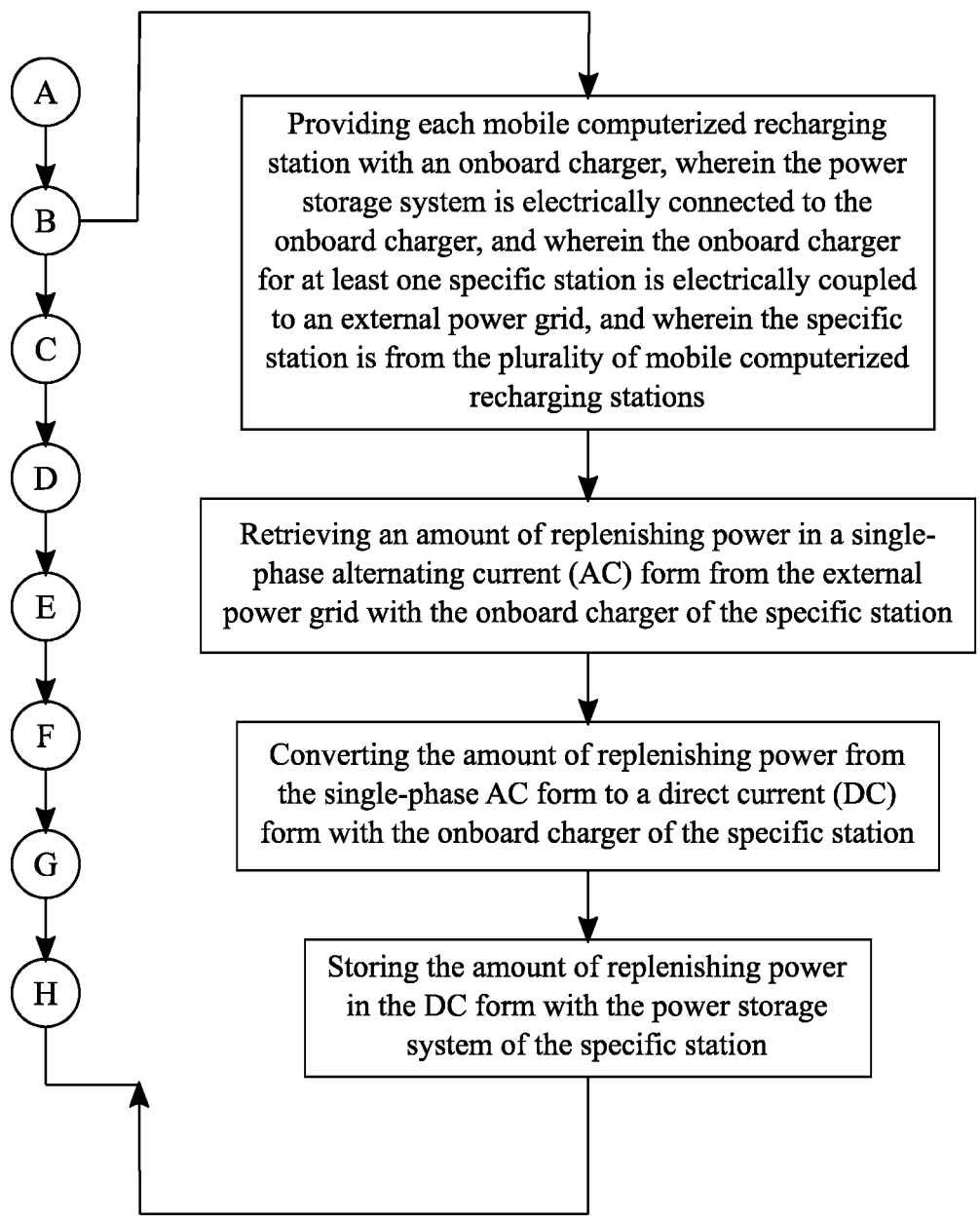
FIG. 7 is a flowchart illustrating the subprocess for harnessing power in AC form directly from the power grid and converting the power in AC form to DC form with an onboard charger.

In order to harness power directly from the power grid, each mobile computerized recharging station is provided with an onboard charger, wherein the power storage system is electrically connected to the onboard charger, seen in FIG. 7. The onboard charger recharges the power storage system once the power storage system is depleted by converting the power in alternating current (AC) of the external power grid to power in DC form. Moreover, the onboard charger for at least one specific station is electrically coupled to an external power grid, and the specific station is from the plurality of mobile computerized recharging stations. The external power grid preferably a network of power providers within a designated area that distributes power to consumers within that area. While the power storage system is charging, energy is transferred from AC form to DC form as an amount of replenishing power in single-phase AC form is retrieved from the external power grid with the onboard charger of the specific station. The amount of replenishing power is converted from the single-phase AC form to the DC form with the onboard charger of the specific station. The amount of replenishing power is stored in the DC form with the power storage system of the specific station, thereby allowing the power storage system to receive power from the external power grid in a compatible DC form. Consequently, the power stored in DC form with the power storage system is readily available for any off-grid device with faster delivery charging speeds and an efficient transfer rate.

Figure 8:
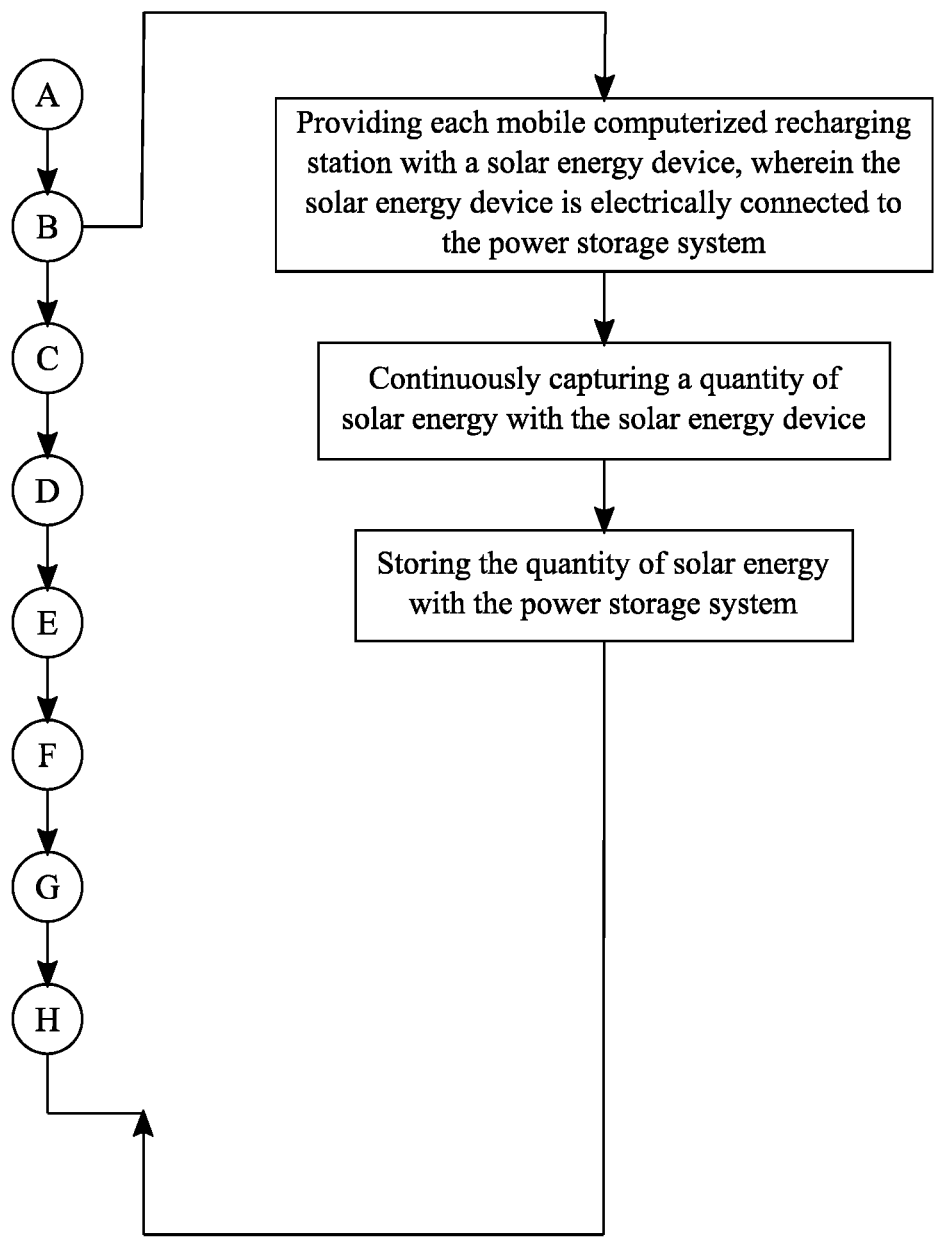
FIG. 8 is a flowchart illustrating the subprocess for utilizing a solar energy device as a supplementary source of power.

As each mobile computerized recharging station is meant to be easily accessible by a plurality of user accounts for each of their vehicles, each mobile computerized recharging station is safely positioned outdoors. In order to utilize the direct exposure to the Sun, each mobile computerized recharging station is provided with a solar energy device, as seen in FIG. 8. The solar energy device harnesses solar energy and converts the harnessed solar energy into power. Moreover, the solar energy device utilizes natural resources to provide an additional power supply other than that harnessed from the external power grid. The solar energy device is electrically connected to the power storage system in order for each mobile computerized recharging station to be provided with a supplemental power supply. Moreover, a quantity of solar energy is continuously captured with the solar device. The quantity of solar energy is stored with the power storage system, utilizing the outdoor position of each mobile computerized recharging station. In the preferred embodiment of the present invention, the solar energy device is a solar sail that expands across a roof of each mobile computerized recharging station. The solar sail and the position of the solar sail with the mobile computerized recharging station maximizes the exposure of the sunlight from the Sun to the solar sail.

Figure 9:
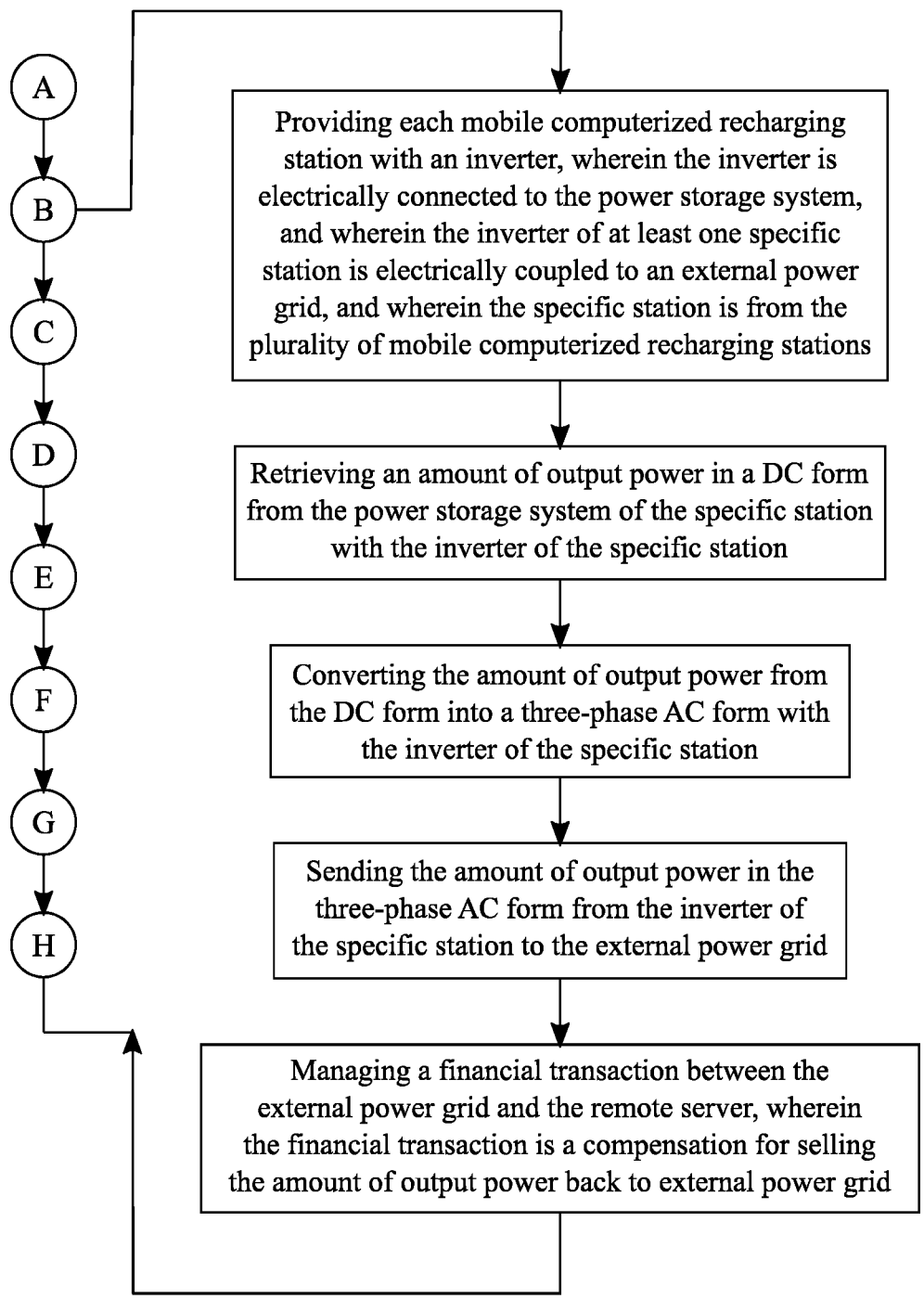
FIG. 9 is a flowchart illustrating the subprocess for delivering remaining power of a specific station back to the external power grid in AC form.

In order for the plurality of mobile computerized recharging stations to deliver excess power not harnessed by an off-grid device associated with a user account back to the external power grid, each mobile computerized recharging station is provided with an inverter, seen in FIG. 9. The inverter converts power in three-phase AC form that is originally in DC form with the power storage system. Power in three-phase AC form may be required for chargers of off-grid devices as well. Furthermore, power ranging from 10 kilowatts to 500 kilowatts in DC form is inverted into three-phase AC form. The inverter is electrically connected to the power storage system, and the inverter of at least one specific station is electrically coupled to an external power grid, wherein the specific station is from the plurality of mobile computerized recharging stations. In order to send excess power with the specific station back to the external power grid for redistribution, an amount of output power in a DC form is retrieved from the power storage system of the specific station with the inverter of the specific station. The output power is power stored within the power storage device that may be delivered back to the external power grid. As the external power stores power only in three-phase form, the amount of output power is then converted from the DC form into a three-phase AC form with the inverter of the specific station. Only after the conversion, the amount of output power is sent in the three-phase AC form from the inverter to the specific station to the external power grid. Furthermore, a financial transaction is managed between the external power grid and the remote server, wherein the financial transaction is a compensation for selling the amount of output power back to the external power grid.

Figure 10:
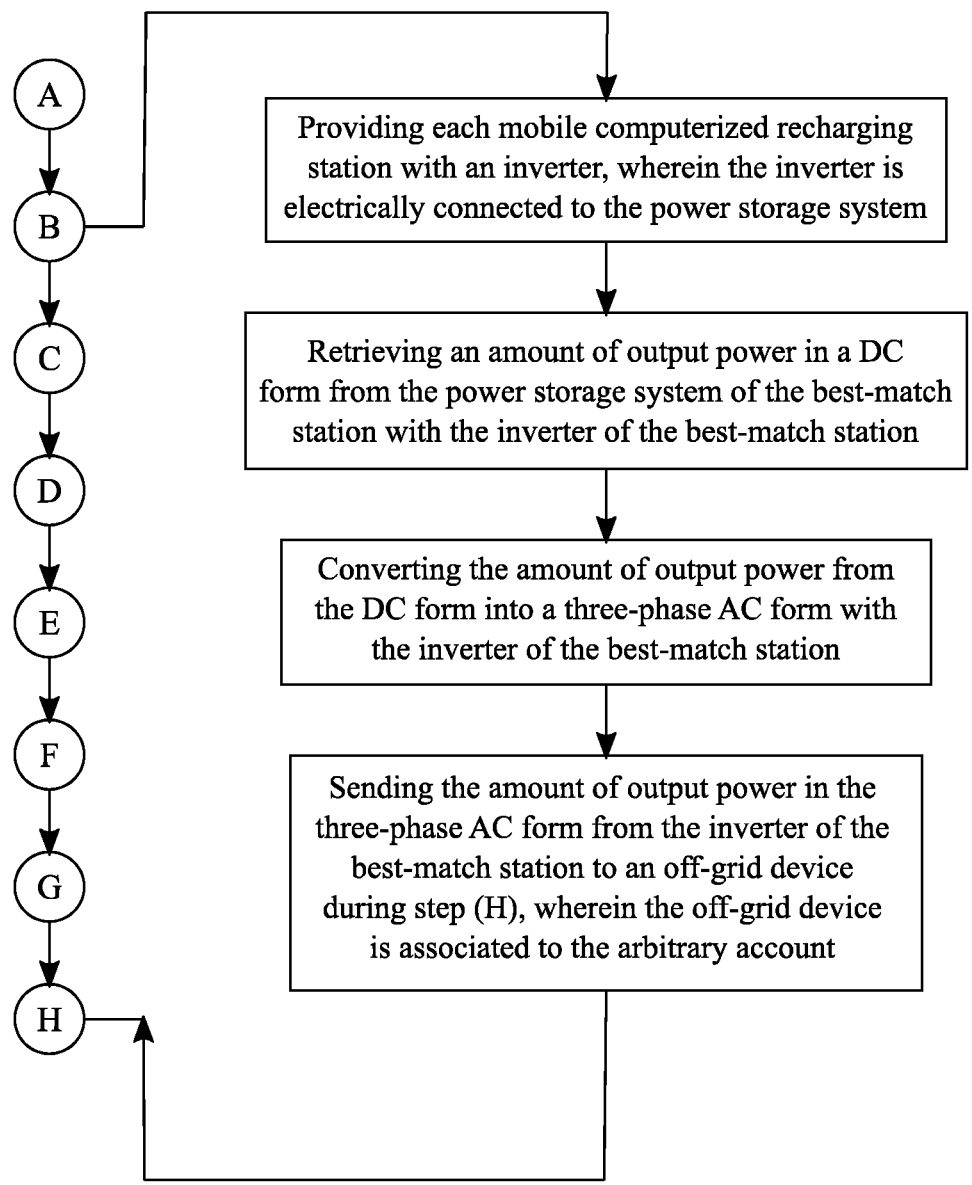
FIG. 10 is a flowchart illustrating the subprocess for harnessing power in AC form for off-grid devices not directly connected to the power grid.

Also, in order for off-grid devices that require power in AC form to receive power from the plurality of mobile computerized recharging stations, an amount of output power in DC form is retrieved from the power storage system of the best match station with the inverter of the best-match station. The output power is power stored within the power storage device that is harnessed by off-grid devices that receives power only in AC form. As seen in FIG. 10, the amount of output power from the DC form is converted into a three-phase AC form with the inverter of the best-match station. The amount of output power is sent in three-phase AC form from the inverter of the best-match station to an off-grid device during Step H, wherein the off-grid device is associated to the arbitrary account. Moreover, this allows certain off-grid devices, such as electric vehicles and household appliances, that only receive power in three-phase AC form to harness power from the present invention.

Figure 11:
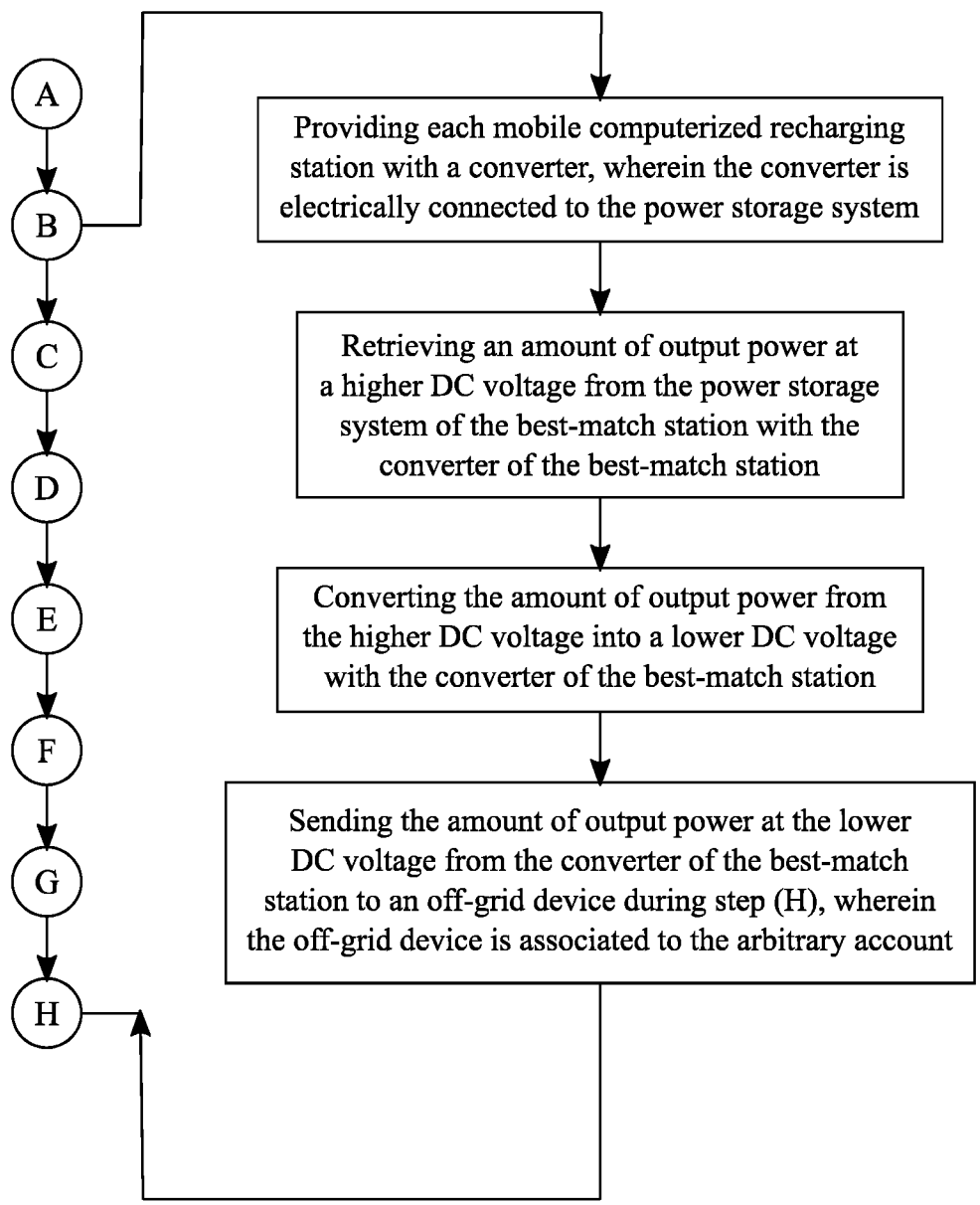
FIG. 11 is a flowchart illustrating the subprocess for providing power in the form of lower DC voltage to off-grid devices with the plurality of mobile computerized recharging stations.

In order for the present invention to output a lower voltage, each mobile computerized recharging station is provided with a converter, seen in FIG. 11, wherein the converter is electrically connected to the power storage system. In the preferred embodiment of the present invention, power ranging from 10 kilowatts to 350 kilowatts in DC form is converted power ranging from 400 volts to 800 volts. Other devices, and vehicles, require power in the form of lower DC voltage than the higher DC voltage stored with the power storage system. An amount of output power, power directly harnessed from the power storage system, is retrieved at a higher DC voltage from the power storage system of the best-match station with the converter of the best-match station. The amount of output power is then converted from the higher DC voltage into a lower DC voltage with the converter of the best-match station. The amount of output power at the lower DC voltage from the converter of the best-match station to an off-grid device during Step H. Moreover, the off-grid device is associated to the arbitrary account. In the preferred embodiment of the present invention, the off-grid device is a vehicle that is registered with the arbitrary account.

Figure 12:
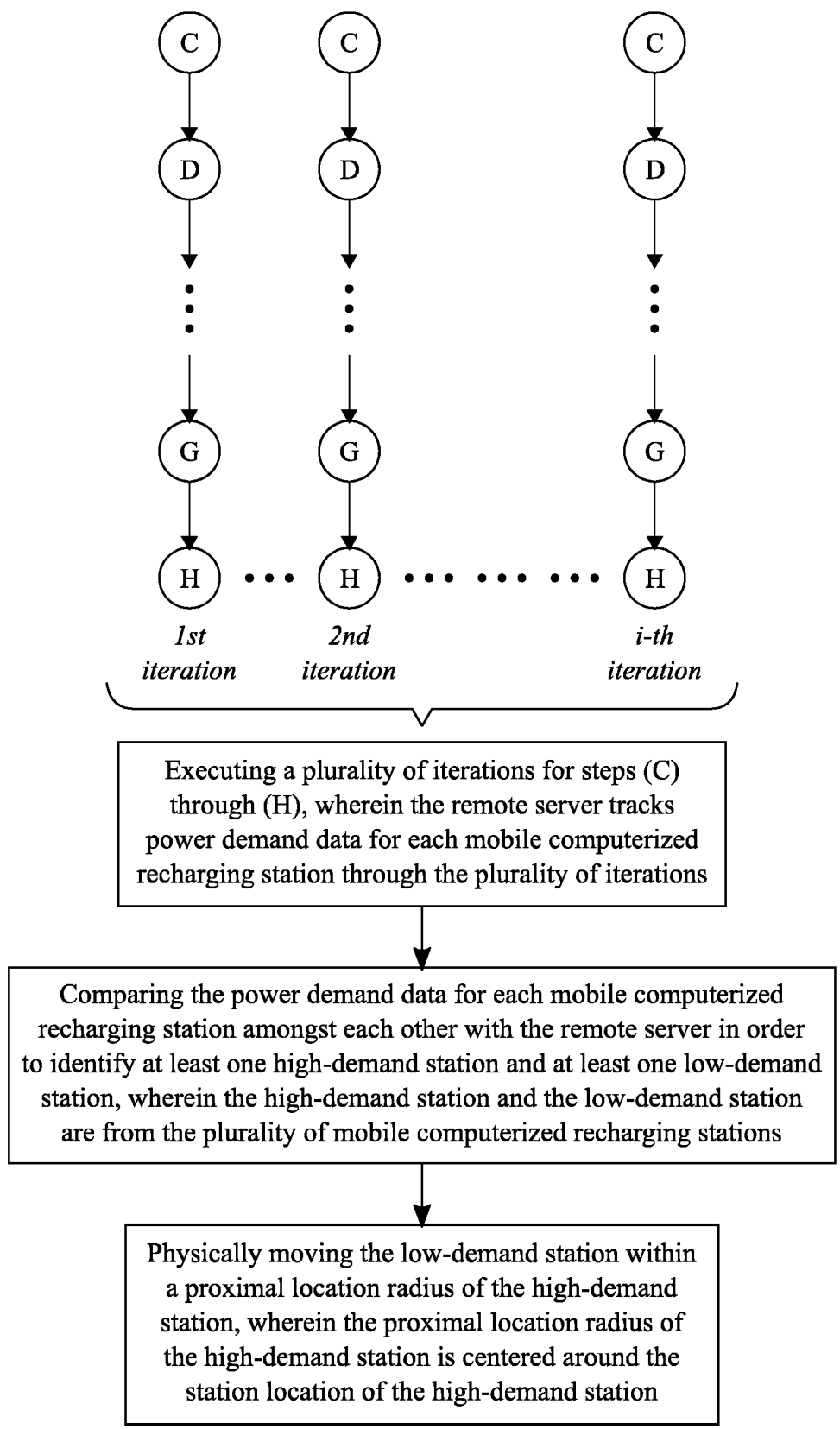
FIG. 12 is a flowchart illustrating the subprocess for identifying at least one high-demand station and at least one low-demand station in order to supply the at least one high-demand station with more available power for a plurality of users.

In order to accurately analyze the frequency of usage and amount of power harnessed by devices of the plurality of user accounts, a plurality of iterations is executed for Steps C through H, wherein the remote server tracks the power demand data for each mobile computerized recharging station through the plurality of iterations. This plurality of iterations executed for Steps C through H is seen in FIG. 12. The power demand data for each mobile computerized recharging station may include, but is not limited to energy usage, revenue generated, energy generation metrics, and so on. The power demand data allows the remote server to determine high-demand areas through the plurality of iterations, and those high-demand areas requires more mobile computerized recharging stations within their proximity. In order for the remote server to identify these areas, the power demand data for each mobile computerized recharging station is compared amongst with each other with the remote server in order to identify at least one high demand station and at least one low-demand station. At least one high demand station is frequently visited and used to charge devices of a relatively large number of user accounts. The at least one high demand station has a station location that is easily accessible by multiple user accounts. The at least one low demand station has a power storage system that is infrequently visited and used to charge devices of a relatively small number of user accounts. More specifically, the high-demand station and the low-demand station are from the plurality of mobile computerized recharging stations. The low-demand station is then physically moved within a proximal location radius of the high-demand station, wherein the proximal location radius of the high-demand station is centered around the station location of the high-demand station. Positioning the low-demand station within the proximal location radius reduces the traffic for the corresponding high-demand station, while allowing the low-demand station within the proximal location radius to be easily accessible from the high-demand station. In the preferred embodiment of the present invention, the low-demand station is physically moved within the proximal location radius of the high-demand station by a user-driven vehicle or an autonomous vehicle.

Figure 13:
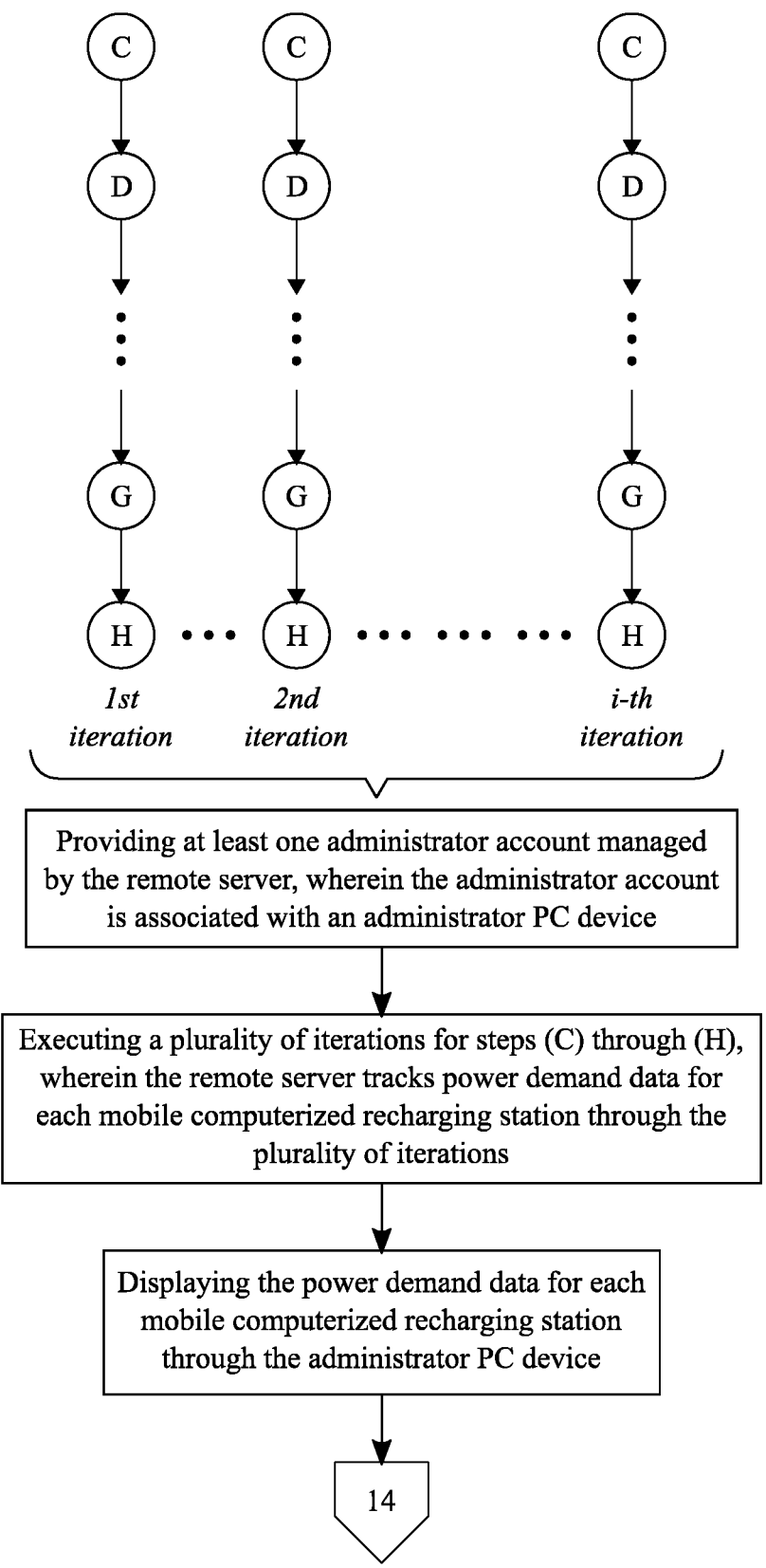
FIG. 13 is a flowchart illustrating the subprocess for the administrator account to relocate a specific station based on power demand data with a user-driven vehicle or an autonomous vehicle.
Figure 14:
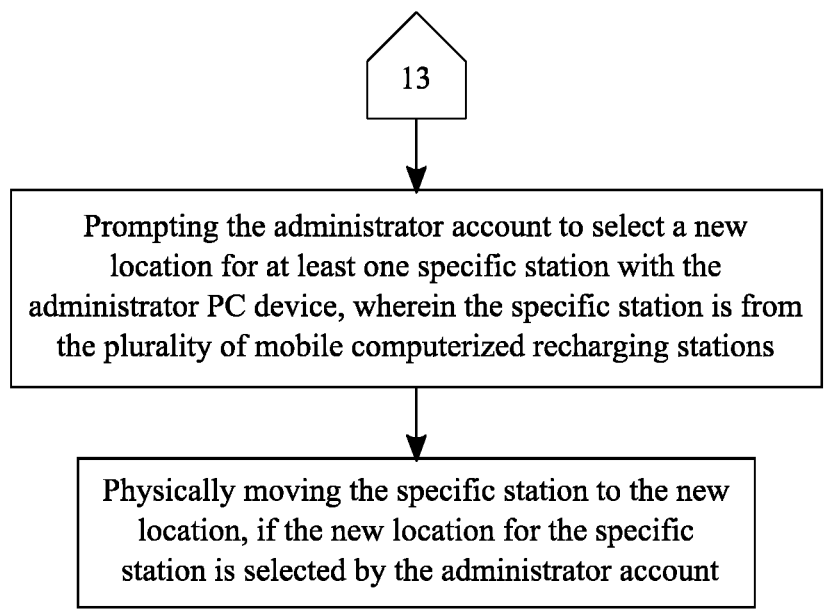
FIG. 14 is a flowchart illustrating a continuation of the flowchart in FIG. 13.

In order to manually determine an optimal location for each of the plurality of mobile computerized recharging stations, at least one administrator account that is managed by the remote server is provided for the present invention. The at least one administrator account manages and monitors the plurality of mobile computerized recharging stations and monitors for high-demand stations and low-demand stations. Similar to the plurality of user accounts, the administrator account is associated with an administrator PC device. As seen in FIG. 13, a plurality of iterations for Steps C through H are executed, wherein the remote server tracks the power demand data for each mobile computerized recharging station through the plurality of iterations. The power demand data is displayed for each mobile computerized recharging station through the administrator PC device so that the administrator account may view the power demand data. The power demand data allows the administrator account to be alerted of new energy usage demands of a specific location and monitor and adjust according to any existing and recurring energy usage demands. Seen in FIG. 14, the administrator account is prompted to select a new location for the at least one specific station with the administrator PC device, wherein the specific station is from the plurality of mobile computerized recharging stations. The new location is a location with high energy usage and a limited number of mobile computerized recharging stations. A high-demand area receives the specific station from a low-demand area as the specific station is physically moved to the new location, if the new location for the specific station is selected by the administrator account. In the preferred embodiment, the specific station is physically moved to the new location by a user-driven vehicle or an autonomous vehicle.

Figure 15:
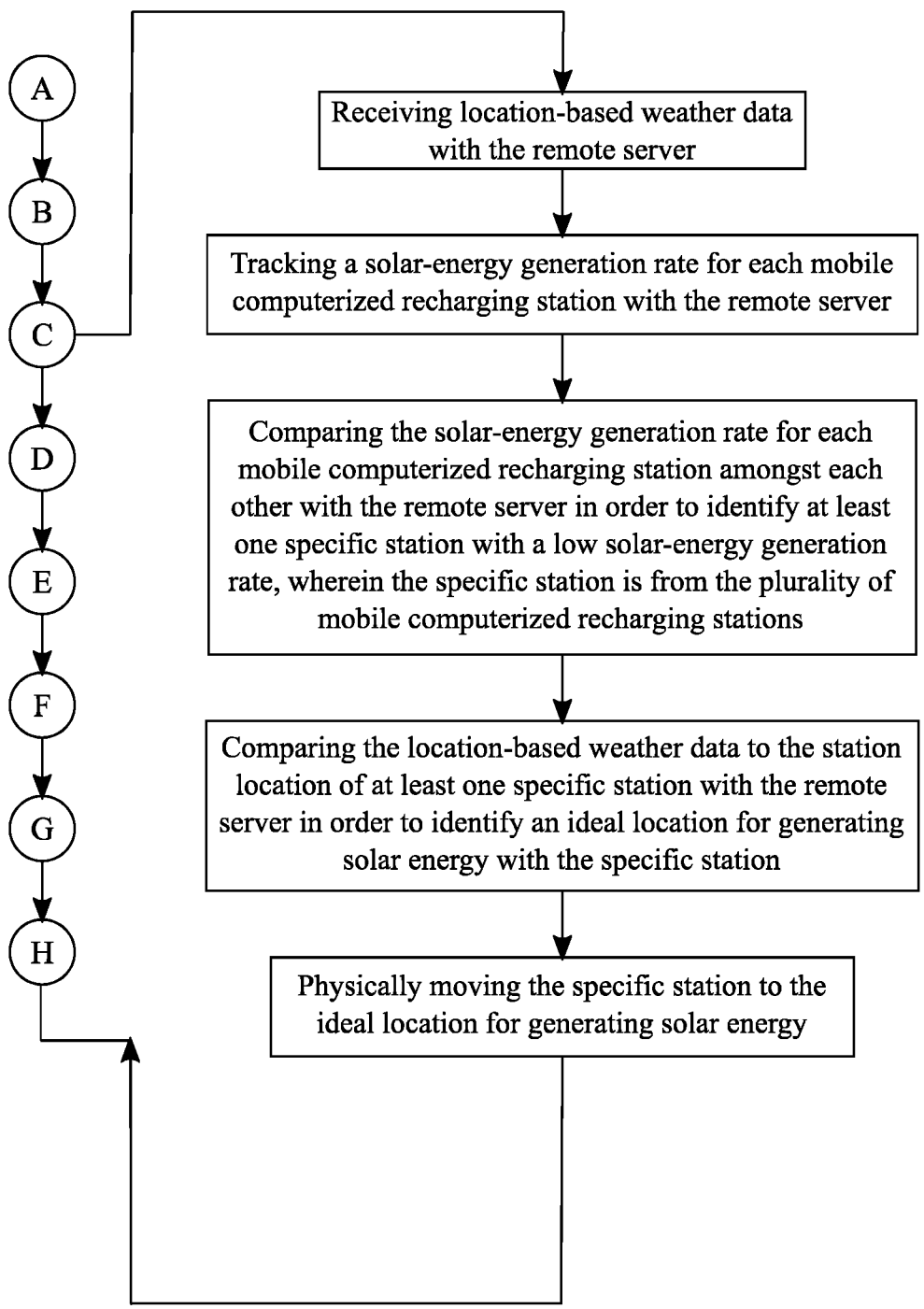
FIG. 15 is a flowchart illustrating the subprocess for relocating a specific station based on location-based weather data to an ideal location for generating solar energy.

As the preferred embodiment of the present invention includes a solar energy device which provides a supplemental energy source for each mobile computerized recharging station, location-based weather data is received with the remote server. Location-based weather data includes cloud cover, precipitation, wind speed, and a variety of other weather factors that may inhibit the solar energy device from receiving direct sunlight. As seen in FIG. 15, a solar-energy generation rate is tracked for each mobile computerized recharging station with the remote server as cloud coverage, a rainy forecast, and a snowy forecast may inhibit direct contact with the Sun depending on the position of the corresponding mobile computerized recharging station. Moreover, the solar-energy generation rate for each mobile computerized recharging station is compared amongst each other with the remote server in order to identify at least one specific station with a low-solar energy generation rate. The solar energy device of the at least one specific station is positioned within an area of shade caused by cloud coverage which results in a low-solar energy generation rate. As cloud coverage may last a significant period of time within a specific area, the at least one specific station will continue to have a low-solar energy generation rate until physically repositioned. The specific station is from the plurality of mobile computerized recharging stations. The location-based weather data is compared to the station location of the at least one specific station with the remote server in order to identify an ideal location for generating solar energy with the specific station. The ideal location for generating solar energy has mostly clear or scattered cloud coverage over a specific range of time. The specific station is therefore physically moved to the ideal location for generating solar energy, optimizing the power supply of each mobile computerized recharging station. In the preferred embodiment, the specific station is physically moved to the ideal location for generating solar energy by a user-driven vehicle or autonomous vehicle.

Figure 16:
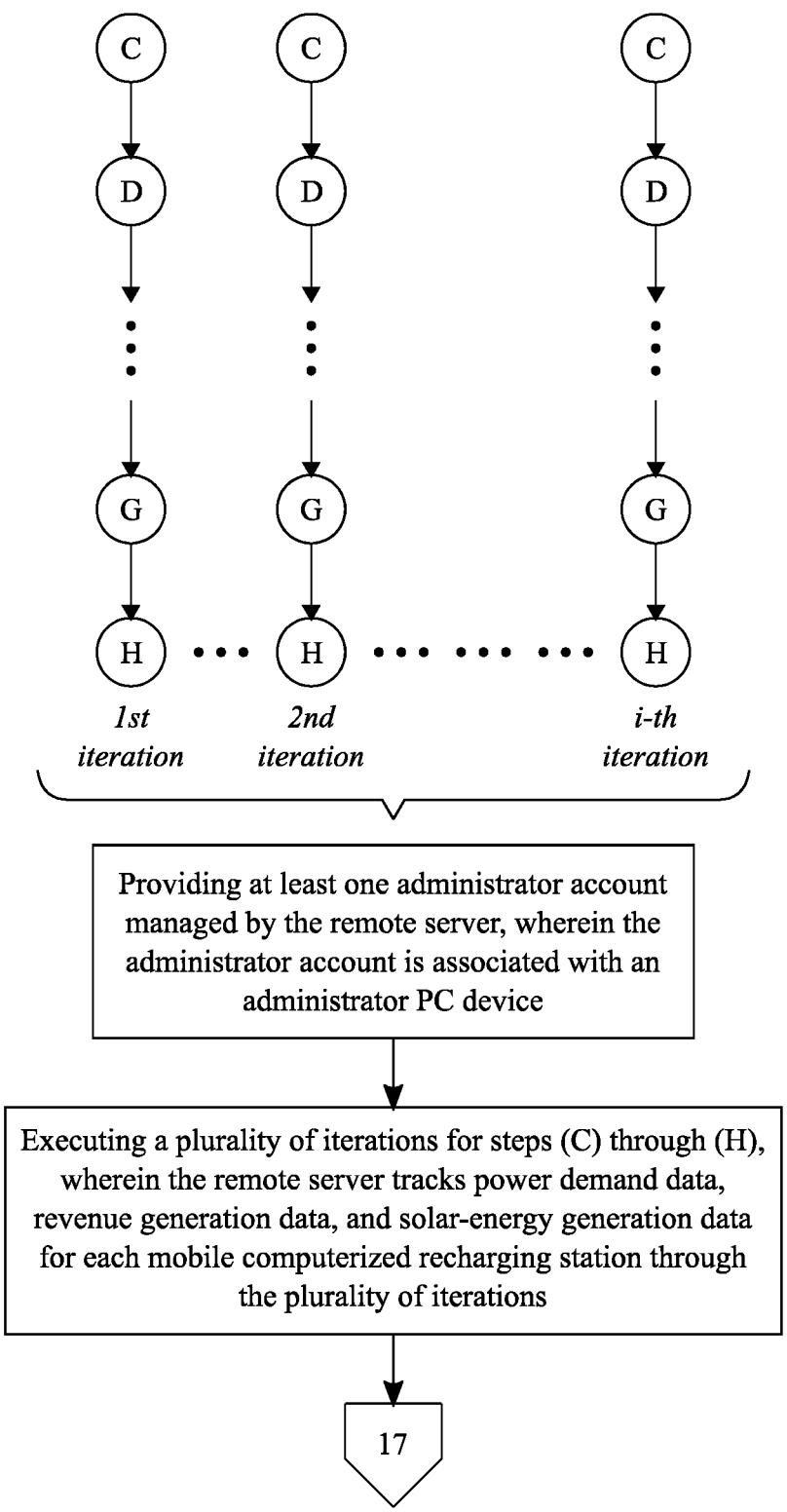
FIG. 16 is a flowchart illustrating the subprocess for processing power demand data, revenue generation data, and solar-energy generation data for each mobile computerized recharging station.
Figure 17:
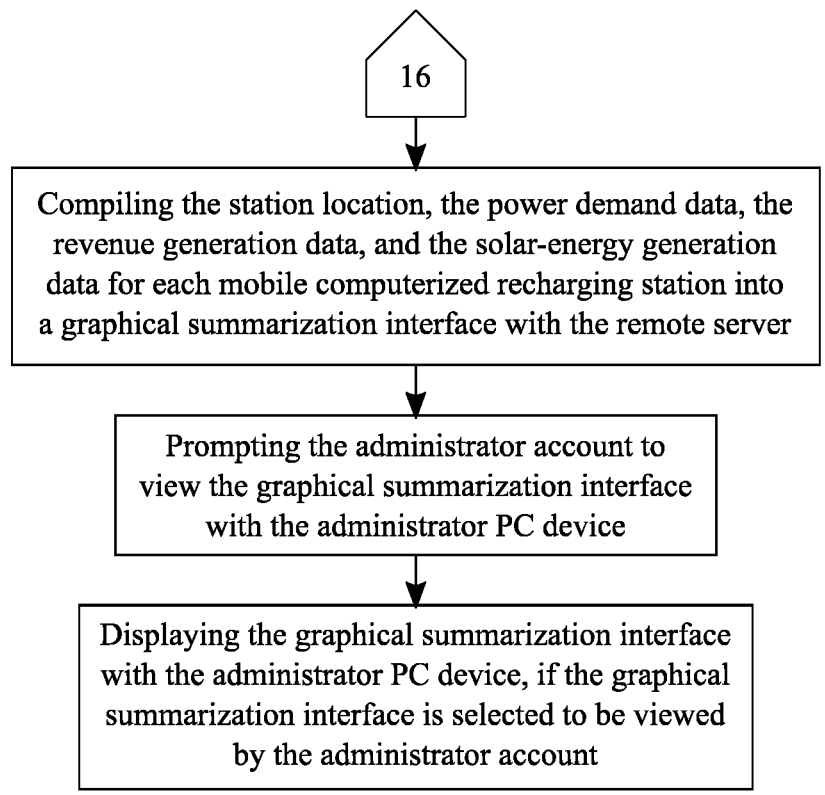
FIG. 17 is a flowchart illustrating a continuation of the flowchart in FIG. 16.

As seen in FIG. 16, a plurality of iterations for Steps C through H are executed, wherein the remote server tracks the power demand data, revenue generation, and solar-energy generation data for each mobile computerized recharging station through the plurality of iterations. The station location, the power demand data, the revenue generation, and the solar-energy generation is compiled for each mobile computerized recharging station into a graphical summarization interface with the remote server, shown in FIG. 17. The graphical summarization interface generates visual aids such as tables, charts, and maps that display power demand data, the revenue generation, and the solar-energy generation for the plurality of mobile computerized recharging stations based on each station location. This allows the at least one administrator account to do a quick visual review and analyze the value of each mobile computerized recharging station. The administrator account is prompted to view the graphical summarization interface with the administrator PC device so the administrator account may make an informed decision if a mobile computerized recharging station should be relocated. The graphical summarization interface is displayed with the administrator PC device, if the graphical summarization interface is selected to be viewed by the administrator account. The administrator account is therefore able to review and navigate the graphical summarization interface, make an informed decision, and perform the appropriate actions regarding the relocation of a mobile computerized recharging station.

Although the invention has been explained in relation to its preferred embodiment, it is to be understood that many other possible modifications and variations can be made without departing from the spirit and scope of the invention as hereinafter claimed.

What is claimed is:

1. A method of managing power for recharging electric vehicles, the method comprises the steps of:
   (A) providing a plurality of user accounts managed by at least one remote server, wherein each user account is associated with a corresponding user personal computing (PC) device, and wherein a minimum threshold of available power is stored on the remote server;
   (B) providing a plurality of mobile computerized recharging stations, wherein each mobile computerized recharging station tracks a station location and a current amount of available power within a power storage system, and wherein each mobile computerized recharging station is housed within a transportable enclosure;

(C) prompting each user account to search for at least one best-match station from the plurality of mobile computerized recharging stations with the corresponding user PC device;

(D) relaying a search request for the best-match station from the corresponding user PC device of an arbitrary account to the remote server, wherein the arbitrary account is any user account from the plurality of user accounts, and wherein the search request includes a current location of the arbitrary account;

(E) comparing the current location of the arbitrary account to the station location for each mobile computerized recharging station with the remote server in order to identify a plurality of proximal stations from the plurality of mobile computerized recharging stations;

(F) comparing the minimum threshold of available power to the current amount of available power for each proximal station with the remote server in order to identify at least one sufficiently-powered station from the plurality of proximal stations;

(G) displaying the sufficiently-powered station as the best-match station through the corresponding user PC device of the arbitrary user account; and, (H) metering an amount of exchanged power between the arbitrary user account and the best-match station with the remote server;

sequentially executing steps (C) through (G);

providing each mobile computerized recharging station with a solar energy device, wherein the solar energy device is electrically connected to the power storage system, and wherein the solar energy device is a solar sail, and wherein the solar sail is expanded across a roof of each mobile computerized recharging station;

continuously capturing a quantity of solar energy with the solar energy device;

storing the quantity of solar energy with the power storage system;

receiving location-based weather data with the remote server;

tracking a solar-energy generation rate for each mobile computerized recharging station with the remote server;

comparing the solar-energy generation rate for each mobile computerized recharging station amongst each other with the remote server in order to identify at least one low solar-energy generation station with a low solar-energy generation rate, wherein the low solar-energy generation station is from the plurality of mobile computerized recharging stations;

comparing the location-based weather data to the station location of the low solar-energy generation station with the remote server in order to identify an ideal location for generating solar energy with the low solar-energy generation station; and, physically moving the low solar-energy generation station to the ideal location for generating solar energy.

2. The method of managing power for recharging electric vehicles, the method as claimed in claim 1 comprises the steps of:

providing at least one vehicle registration for each user account;

providing each mobile computerized recharging station with a scanning device;

retrieving an identification reading from the scanning device of the best-match station before step (H); and, executing step (H), if the identification reading matches the vehicle registration of the arbitrary account.

3. The method of managing power for recharging electric vehicles, the method as claimed in claim 1 comprises the steps of:

providing each mobile computerized recharging station with a wireless broadband radio transceiver; and, communicably coupling the wireless broadband radio transceiver of each mobile computerized recharging station with the remote server.

4. The method of managing power for recharging electric vehicles, the method as claimed in claim 1, wherein the power storage system is a modular lithium-ion based battery system.

5. The method of managing power for recharging electric vehicles, the method as claimed in claim 1 comprises the steps of:

providing each mobile computerized recharging station with an onboard charger, wherein the power storage system is electrically connected to the onboard charger, and wherein the onboard charger for at least one specific station is electrically coupled to an external power grid, and wherein the specific station is from the plurality of mobile computerized recharging stations;

retrieving an amount of replenishing power in a single-phase alternating current (AC) form from the external power grid with the onboard charger of the specific station;

converting the amount of replenishing power from the single-phase AC form to a direct current (DC) form with the onboard charger of the specific station; and, storing the amount of replenishing power in the DC form with the power storage system of the specific station.

6. The method of managing power for recharging electric vehicles, the method as claimed in claim 1 comprises the steps of:

providing each mobile computerized recharging station with an inverter, wherein the inverter is electrically connected to the power storage system, and wherein the inverter of at least one specific station is electrically coupled to an external power grid, and wherein the specific station is from the plurality of mobile computerized recharging stations;

retrieving an amount of output power in a DC form from the power storage system of the specific station with the inverter of the specific station;

converting the amount of output power from the DC form into a three-phase AC form with the inverter of the specific station;

sending the amount of output power in the three-phase AC form from the inverter of the specific station to the external power grid; and, managing a financial transaction between the external power grid and the remote server, wherein the financial transaction is a compensation for selling the amount of output power back to external power grid.

7. The method of managing power for recharging electric vehicles, the method as claimed in claim 1 comprises the steps of:

providing each mobile computerized recharging station with an inverter, wherein the inverter is electrically connected to the power storage system;

retrieving an amount of output power in a DC form from the power storage system of the best-match station with the inverter of the best-match station;

converting the amount of output power from the DC form into a three-phase AC form with the inverter of the best-match station; and, sending the amount of output power in the three-phase AC form from the inverter of the best-match station to an off-grid device during step (H), wherein the off-grid device is associated to the arbitrary account.

8. The method of managing power for recharging electric vehicles, the method as claimed in claim 1 comprises the steps of:

providing each mobile computerized recharging station with a converter, wherein the converter is electrically connected to the power storage system;

retrieving an amount of output power at a higher DC voltage from the power storage system of the best-match station with the converter of the best-match station;

converting the amount of output power from the higher DC voltage into a lower DC voltage with the converter of the best-match station; and, sending the amount of output power at the lower DC voltage from the converter of the best-match station to an off-grid device during step (H), wherein the off-grid device is associated to the arbitrary account.

9. The method of managing power for recharging electric vehicles, the method as claimed in claim 1 comprises the steps of:

executing a plurality of iterations for steps (C) through (H), wherein the remote server tracks power demand data for each mobile computerized recharging station through the plurality of iterations;

comparing the power demand data for each mobile computerized recharging station amongst each other with the remote server in order to identify at least one high-demand station and at least one low-demand station, wherein the high-demand station and the low-demand station are from the plurality of mobile computerized recharging stations; and, physically moving the low-demand station within a proximal location radius of the high-demand station, wherein the proximal location radius of the high-demand station is centered around the station location of the high-demand station.

10. The method of managing power for recharging electric vehicles, the method as claimed in claim 9, wherein the low-demand station is physically moved within the proximal location radius of the high-demand station by a user-driven vehicle or an autonomous vehicle.

11. The method of managing power for recharging electric vehicles, the method as claimed in claim 1 comprises the steps of:

providing at least one administrator account managed by the remote server, wherein the administrator account is associated with an administrator PC device;

executing a plurality of iterations for steps (C) through (H), wherein the remote server tracks power demand data for each mobile computerized recharging station through the plurality of iterations;

displaying the power demand data for each mobile computerized recharging station through the administrator PC device;

prompting the administrator account to select a new location for at least one specific station with the administrator PC device, wherein the specific station is from the plurality of mobile computerized recharging stations; and, physically moving the specific station to the new location, if the new location for the specific station is selected by the administrator account.

12. The method of managing power for recharging electric vehicles, the method as claimed in claim 11, wherein the specific station is physically moved to the new location by a user-driven vehicle or an autonomous vehicle.

13. The method of managing power for recharging electric vehicles, the method as claimed in claim 1, wherein the low solar-energy generation station is physically moved to the ideal location for generating solar energy by a user-driven vehicle or an autonomous vehicle.

14. The method of managing power for recharging electric vehicles, the method as claimed in claim 1 comprises the steps of:

providing at least one administrator account managed by the remote server, wherein the administrator account is associated with an administrator PC device;

executing a plurality of iterations for steps (C) through (H), wherein the remote server tracks power demand data, revenue generation data, and solar-energy generation data for each mobile computerized recharging station through the plurality of iterations;

compiling the station location, the power demand data, the revenue generation data, and the solar-energy generation data for each mobile computerized recharging station into a graphical summarization interface with the remote server;

prompting the administrator account to view the graphical summarization interface with the administrator PC device; and, displaying the graphical summarization interface with the administrator PC device, if the graphical summarization interface is selected to be viewed by the administrator account.

* * * * *